(12) United States Patent
Li et al.

(10) Patent No.: US 8,848,319 B1
(45) Date of Patent: Sep. 30, 2014

(54) FLEXURE, HEAD GIMBAL ASSEMBLY AND DISK DRIVE UNIT WITH THE SAME, AND MANUFACTURING METHOD THEREOF

(71) Applicant: SAE Technologies Delevopment (Dongguan) Co., Ltd., GuangDong (CN)

(72) Inventors: Bing Hui Li, GuangDong (CN); Wei Qiang Zhou, GuangDong (CN); Dong Lan Huang, GuangDong (CN); Cheng Yuan Luo, GuangDong (CN); Zong Qiang Yu, GuangDong (CN)

(73) Assignee: SAE Technologies Development (Dongguan) Co., Ltd, Guangdong (CN)

( * ) Notice: Subject to any disclaimer, the term of this patent is extended or adjusted under 35 U.S.C. 154(b) by 0 days.

(21) Appl. No.: 13/887,567

(22) Filed: May 6, 2013

(30) Foreign Application Priority Data

Mar. 29, 2013 (CN) .......................... 2013 1 0108012

(51) Int. Cl.
*G11B 5/147* (2006.01)
*B32B 3/26* (2006.01)
*G11B 5/48* (2006.01)

(52) U.S. Cl.
CPC .............. *G11B 5/4826* (2013.01); *B32B 3/266* (2013.01)
USPC ....................................................... 360/245.9

(58) Field of Classification Search
USPC .......... 360/245.9, 245.7, 245.8, 245.3, 234.3, 360/234.5, 244.3; 29/603.03, 603.04
See application file for complete search history.

(56) References Cited

U.S. PATENT DOCUMENTS

| | | | |
|---|---|---|---|
| 6,673,256 B2 * | 1/2004 | Takasugi | 216/22 |
| 7,218,481 B1 * | 5/2007 | Bennin et al. | 360/294.4 |
| 7,440,236 B1 * | 10/2008 | Bennin et al. | 360/294.4 |
| 8,154,827 B2 * | 4/2012 | Contreras et al. | 360/264.2 |
| 2002/0131202 A1 * | 9/2002 | Westwood | 360/110 |
| 2003/0081359 A1 * | 5/2003 | Pust et al. | 360/319 |
| 2006/0209470 A1 * | 9/2006 | Ohta et al. | 360/319 |
| 2007/0139826 A1 * | 6/2007 | Carey et al. | 360/319 |
| 2007/0281079 A1 * | 12/2007 | Carey et al. | 427/131 |
| 2008/0042779 A1 * | 2/2008 | Carey et al. | 333/167 |
| 2010/0007993 A1 * | 1/2010 | Contreras et al. | 360/245.8 |
| 2013/0128381 A1 * | 5/2013 | Okamura et al. | 360/75 |

* cited by examiner

*Primary Examiner* — Allen T Cao
(74) *Attorney, Agent, or Firm* — Nixon & Vanderhye PC

(57) ABSTRACT

A flexure for a suspension of a head gimbal assembly includes a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer. The new structure of the flexure can avoid or eliminate electro-static discharges enduringly without dipping water. A head gimbal assembly and a disk drive unit with the same, a manufacturing method for the flexure are also disclosed.

18 Claims, 8 Drawing Sheets

FLEXURE, HEAD GIMBAL ASSEMBLY AND DISK DRIVE UNIT WITH THE SAME, AND MANUFACTURING METHOD THEREOF

This application claims priority to Chinese Application No. 201310108012.1 filed Mar. 29, 2013, the entire contents of which is hereby incorporated by reference.

FIELD OF THE INVENTION

The present invention relates in general to information recording disk drive, and more particularly to a flexure, a head gimbal assembly (HGA) and a disk drive unit with the same, and a manufacturing method of a flexure.

BACKGROUND OF THE INVENTION

Electro-static charge is an undesired event and a major problem during the production of electronic components. Electro-static discharge (ESD) is vital to the manufacture of electronic components that are sensitive to static electricity, such as hard disk drives (HDD), semiconductors and electronic assemblies packaging. ESD may bring shorting-circuit, opening-circuit, loss of function, or disqualification of parameter to the electronic components, and thereby resulting in losing operational capability or performance reduction of them. ESD is regarded as the biggest potential killer to the quality of the electronic components, thus electro-static protection becomes a key content of controlling the quality of the electronic components.

Thus, ESD should be avoided or eliminated by static-control for electro-static protection for electronic components.

Typically, referring to FIG. 1, a disk drive unit 1' contains a number of rotatable magnetic disks 15' attached to a spindle motor 17', and a head stack assembly (HSA) 13' which is rotatable about an actuator arm axis for accessing data tracks on the magnetic disks 15' during seeking. The HSA 13' contains a set of drive arms 131' and HGAs 132' mounted on the ends of the drive arms 131'. Typically, a spindling voice-coil motor (VCM) 19' is provided for controlling the motion of the drive arm 131'.

Referring to FIGS. 1 and 2, the HGA 132' contains a magnetic head 12' and a flexure 20' supporting the magnetic head 12'. When the hard disk drive 1' is on, the spindle motor 17' will rotate the disk 15' at a high speed, and the magnetic head 12' will fly above the disk 15' due to the air pressure drawn by the rotated disk 15'. The magnetic head 12' moves across the surface of the disk 15' in the radius direction under the control of the VCM 19'. With a different track, the magnetic head 12' can read data from or write data to the disk 15'.

Generally, multiple electrical connection pads 134' are arranged on one end of the flexure 20' and adapted for connecting to the bonding pads of the magnetic head 12' by the way of solder joints 148'. The other end of the flexure 20' has a number of electrical pads 136' (as shown in FIG. 3) disposed thereon and connected to a external control system (not shown). Thus, the flexure 20' serves as the bridge electrically connecting the magnetic head 12' and the external control system.

FIG. 3 shows a typical flexure configuration. Referring to FIG. 3, the flexure 20' includes a stainless steel type (SST) layer 22', a dielectric layer 24', a copper layer 26' and a Polyimide (PI) cover layer 28'. The detailed configuration of the flexure 20' is that the dielectric layer 24' is sandwiched between the SST layer 22' and the copper layer 26', and the PI cover layer 28' covers the copper layer 26'. PI material as a plastic is a good electrical insulator, tending to acquire a strong electro-static charge which may result in ESD and cause damage and malfunction in the manufacturing or operational process of the flexure 20'. Because that the flexure 20' is electrically connected to the magnetic head 12', the ESD caused by the flexure 20' also results in the damage of the magnetic head 12', affects its function and performance.

In order to ensure the product security, the previous process of static-control for the flexure is dependent on dipping water. And the resistance of the flexure should be controlled at $10^5 \sim 10^7$ ohm to avoid ESD. However, the dipping water has some disadvantages. First, ultra-pure water used in the process of dipping water has high resistivity and is unstable for duration, the flexure may again generate static charges and damage itself. Second, water is easy to breed bacteria, harmful to the health of employees or consumers. Third, water may erode the components, which reduces the lifetime of the flexure. In addition, the method of dipping water for preventing ESD takes effect only in the manufacturing process, but can not work in the operational process when the flexure has been mounted on the HDD.

Hence, it is desired to provide a flexure, an HGA, and a disk drive unit to overcome the above-mentioned drawbacks.

SUMMARY OF THE INVENTION

One objective of the present invention is to provide a flexure, which can avoid or eliminate ESD enduringly without dipping water.

Another objective of the present invention is to provide a manufacturing method for a flexure, which can avoid or eliminate ESD enduringly without dipping water.

Yet one objective of the present invention is to provide a head gimbal assembly with a flexure, which can avoid or eliminate ESD enduringly without dipping water.

Still one objective of the present invention is to provide a disk drive unit with a flexure, which can avoid or eliminate ESD enduringly without dipping water.

To achieve above objectives, a flexure for a suspension of a head gimbal assembly includes a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

Preferably, the length of the window is 200 to 600 microns.
Preferably, the length of the window is 300 to 400 microns.
As an embodiment of the present invention, the shape of the windows is triangular, square, rectangular, round, or irregular.

Preferably, the antistatic adhesive is made of conducting polymers, metal particles, metal oxides, or carbon materials.
Preferably, the conducting polymers contains polyaniline, polypyrrole, poly(p-phenylene), polythiophene, PEDOT-PSS and derivatives thereof.

Preferably, the carbon materials contains carbon fibers, carbon nano-tube and carbon powder.

A manufacturing method of a flexure for a suspension of a head gimbal assembly, including steps of:
(1) providing a substrate layer;
(2) forming a dielectric layer on the substrate layer;
(3) forming a conducting layer on the dielectric layer;
(4) forming an insulating cover layer on the conducting layer;

(5) opening at least one window at a surface of the insulating cover layer thereby a portion of the conducting layer is exposed;

(6) adhering an antistatic adhesive to at least one side wall of the window and contacting with the conducting layer.

Preferably, the window is formed by machining or chemical etching.

Preferably, the antistatic adhesive is formed by dipping or spraying.

A head gimbal assembly, including a flexure, a load beam supporting the flexure, a base plate and a hinge connecting the load beam and the base plate, the flexure contains a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

A disk drive unit, including a head gimbal assembly, a drive arm attached to the head gimbal assembly, a disk, and a spindle motor to spin the disk, the head gimbal assembly contains a flexure, a load beam supporting the flexure, a base plate and a hinge connecting the load beam and the base plate, the flexure contains a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

In comparison with the prior art, at least one window is configured at a surface of the insulating cover layer thereby a portion of the conducting layer is exposed, and an antistatic adhesive is adhered to at least one side wall of the window and the conducting layer. Namely, there is an antistatic adhesive connecting the conducting layer and the window of the insulating cover layer, and the conducting layer is grounded, thus the antistatic adhesive can prevent or reduce the generation of electro-static charges on the flexure, thereby preventing or eliminating ESD. In addition, the antistatic adhesive can take effect enduringly without dipping water and any corrosion.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
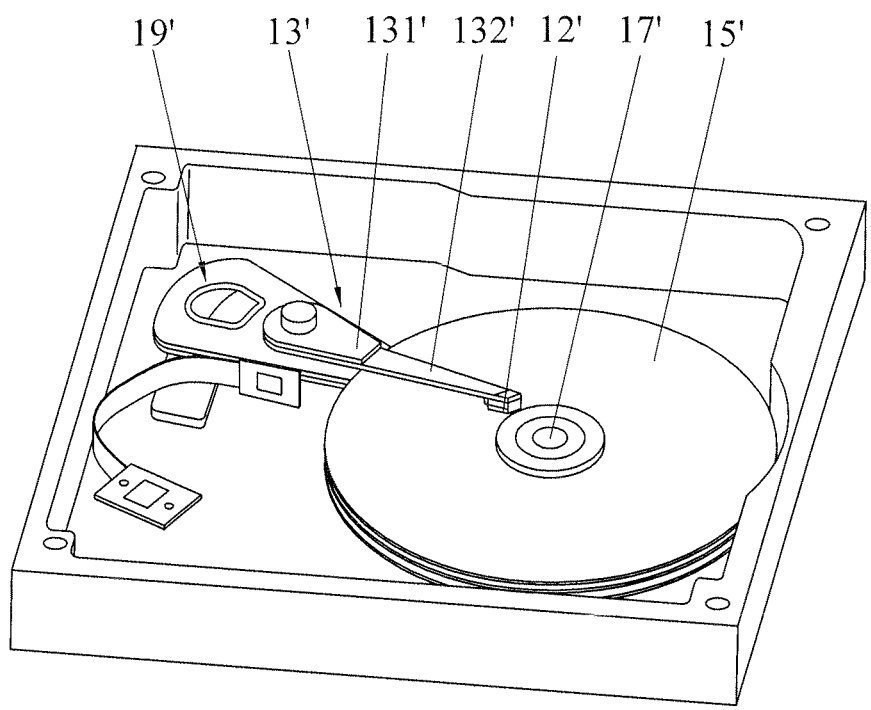
FIG. 1 is a perspective view of a conventional disk drive unit.
Figure 2:
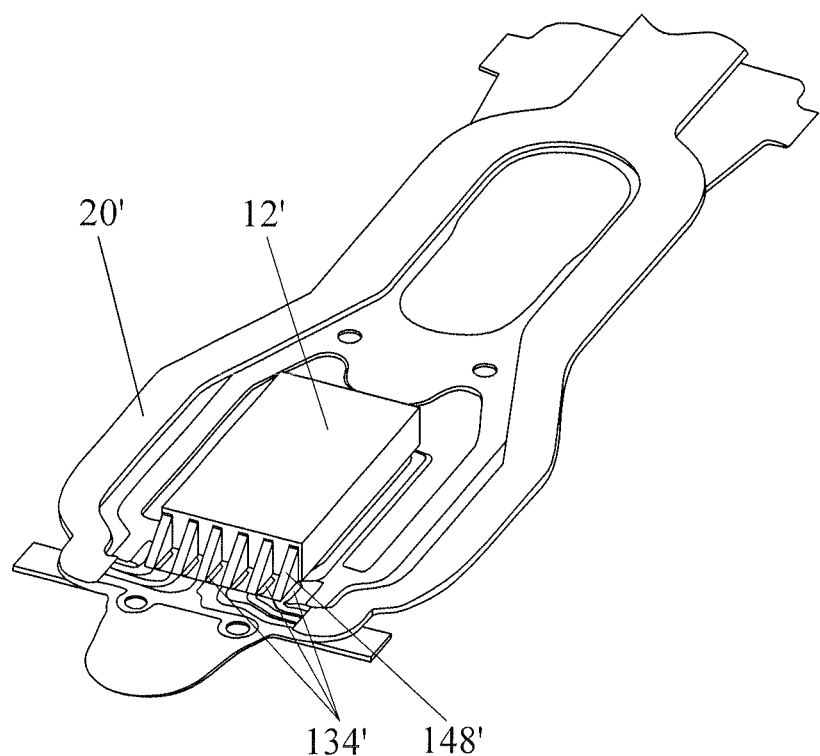
FIG. 2 is a partial perspective view of a conventional HGA with a magnetic head.
Figure 3:
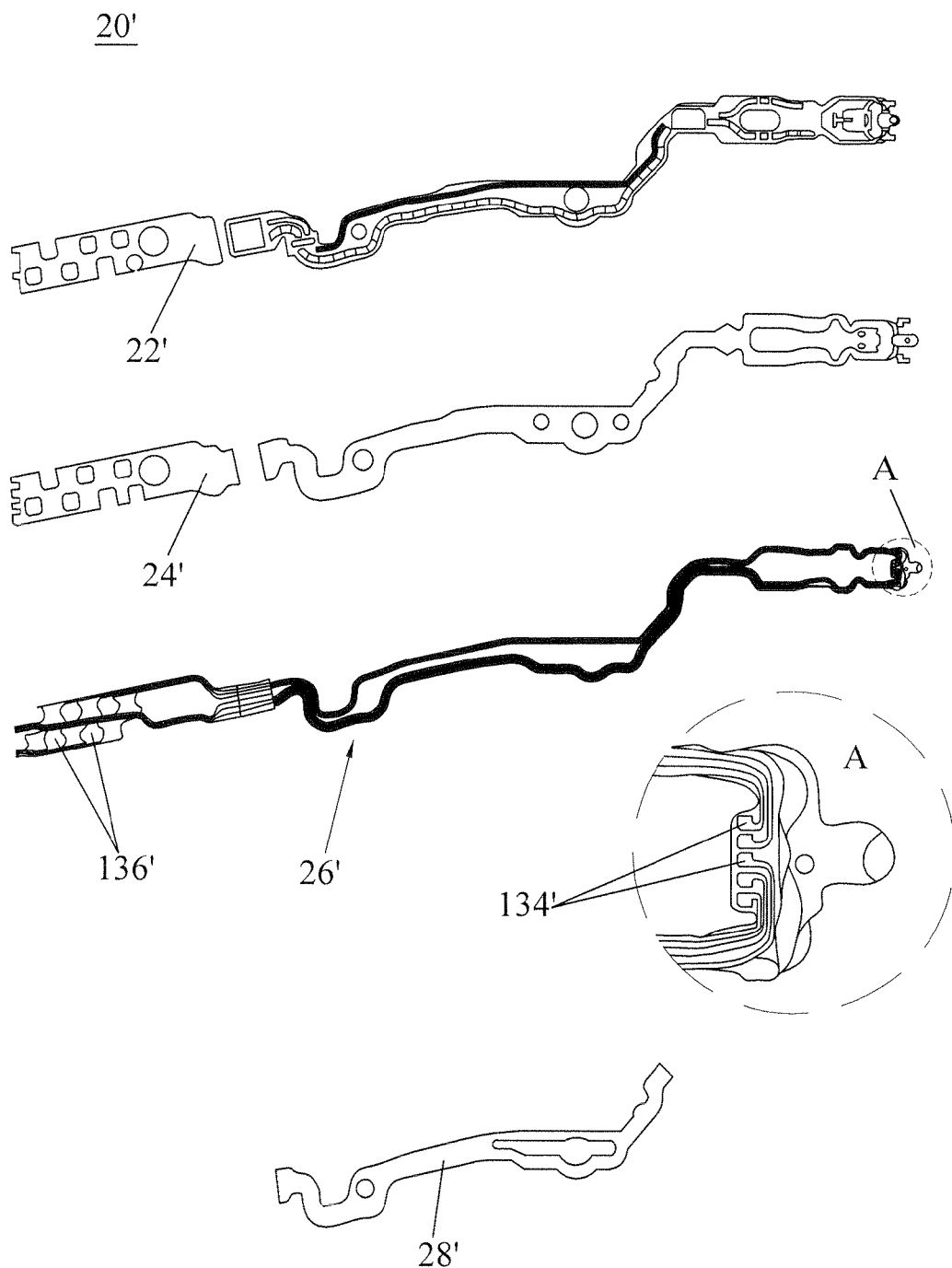
FIG. 3 is a exploded view of a conventional flexure.

Various preferred embodiments of the invention will now be described with reference to the figures, wherein like reference numerals designate similar parts throughout the various views. As indicated above, the present invention is directed to a flexure, an HGA, a disk drive unit with the same, and a manufacturing method of a flexure, thereby avoiding ESD enduringly without dipping water, finally improving the performance thereof.

Figure 4:
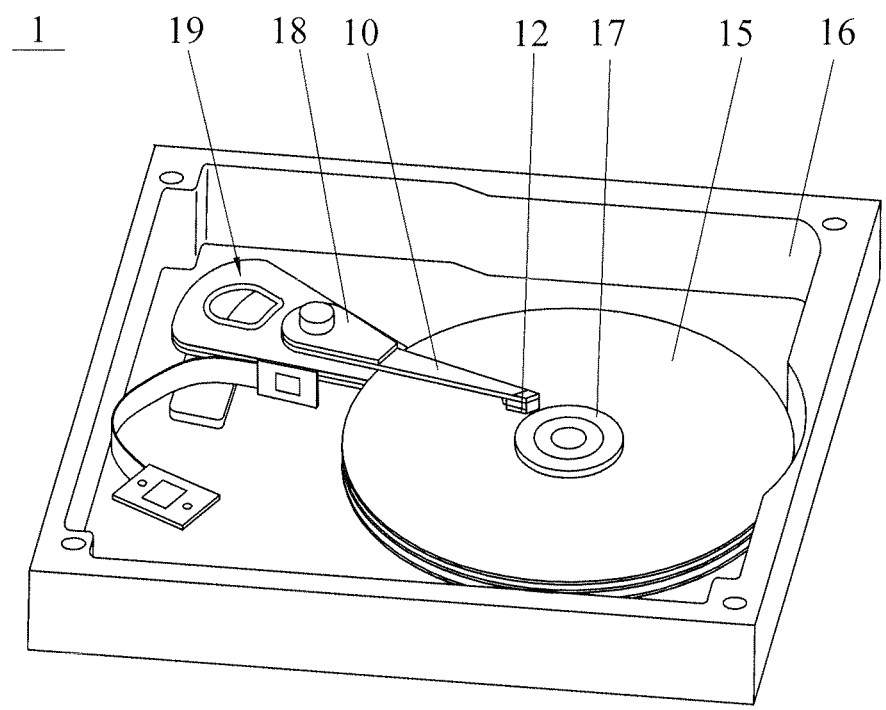
FIG. 4 is a perspective view of the disk drive unit according to one embodiment of the present invention.

FIG. 4 is a perspective view of the disk drive unit of the present invention. As shown, a disk drive unit 1 contains a number of rotatable magnetic disks 15 attached to a spindle motor 17, a set of drive arms 18 and HGAs 10 mounted on the ends of the drive arms 18, all of which are mounted in a housing 16. Typically, a VCM 19 is provided for controlling the motion of the drive arm 18.

Figure 5:
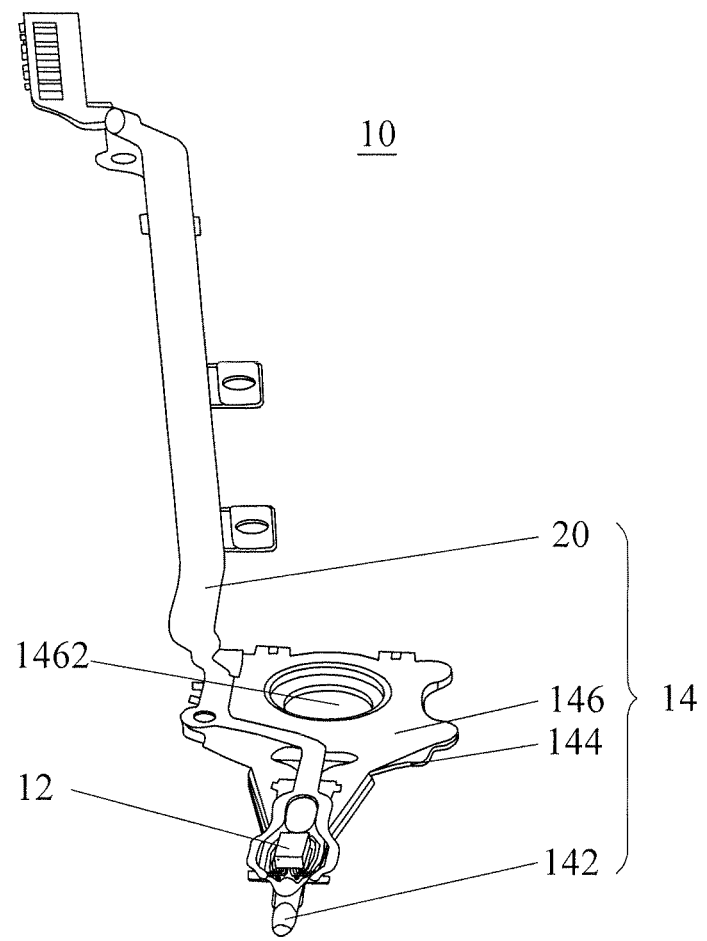
FIG. 5 is a perspective view of the HGA according to one embodiment of the present invention.

Referring to FIGS. 4 and 5, The HGA 10 contains a magnetic head 12 and a suspension 14 for supporting the magnetic head 12. The suspension 14 includes a load beam 142, a base plate 144, a hinge 146 and a flexure 20, all of which are assembled with each other. The hinge 146 has a mounting hole 1462 formed thereon to assemble the hinge 146 to the base plate 144. The flexure 20 includes a suspension tongue (not shown), and the magnetic head 12 is carried on the suspension tongue.

Figure 6A:
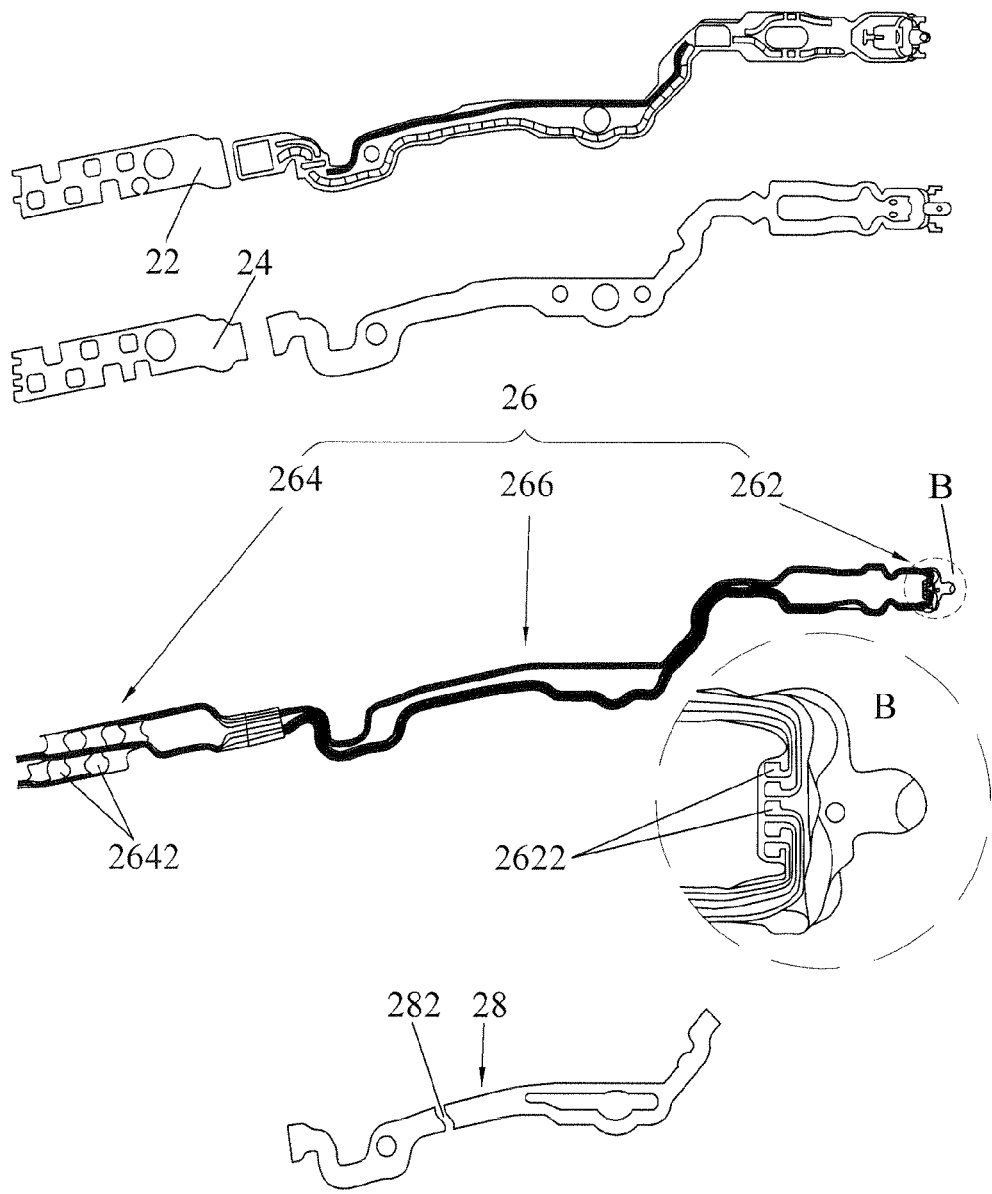
FIG. 6a is a exploded view of a flexure according to one embodiment of the present invention.
Figure 6B:
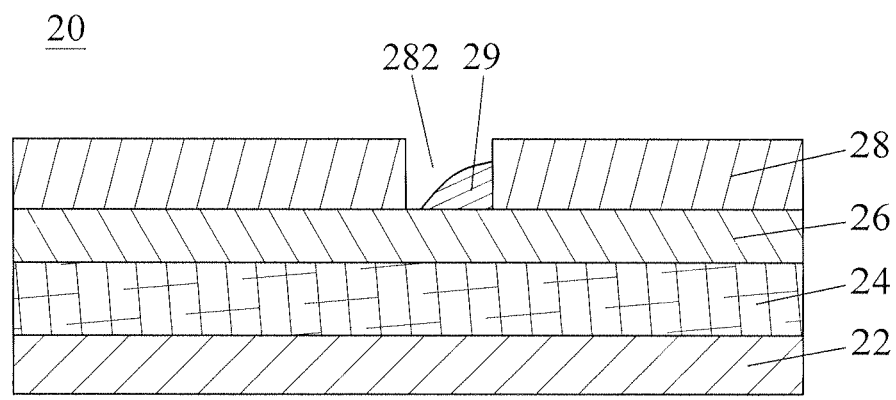
FIG. 6b is a sectional view of a flexure according to one embodiment of the present invention.

Concretely, as shown in FIGS. 6a and 6b, the flexure 20 of the suspension 14 includes a substrate layer 22, a dielectric layer 24 formed thereon, a conducting layer 26 formed on the dielectric layer 24, and an insulating cover layer 28 covered on the conducting layer 26. The substrate layer 22, the dielectric layer 24 and the conducting layer 26 almost have the same length, while the length of the insulating cover layer 28 is shorter thereby exposing the leading end 262 and the tail end 264 of the conducting layer 26. That is, the insulating cover layer 28 covers the trace portion 266 of the conducting layer 26 between the leading end 262 and the tail end 264. Multiple electrical connection pads 2622 are arranged on the leading end 262 and adapted for connecting to the magnetic head 12. The tail end 264 has a number of electrical pads 2642 disposed thereon and connected to a external control system (not shown).

Figure 7:
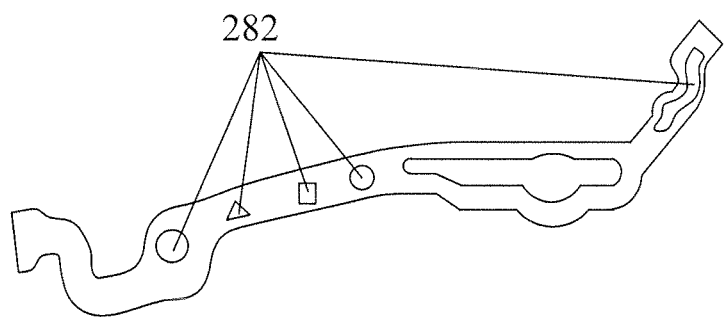
FIG. 7 is a schematic view of an insulating cover layer of the flexure according to one embodiment of the present invention.

Referring to FIGS. 6a, 6b and 7, at least one window 282 is configured at a surface of the insulating cover layer 28 thereby a portion of the trace portion 266 is exposed. The size of the window 282 is not limited; preferably, the length of the window 282 is 200 to 600 microns, and most preferably about 300 to 400 microns. The shape of the window 282 can be triangular, square, rectangular, round, or irregular. And the position and the amount of the window 282 are not limited either, can be selected at any place on the insulating cover layer 28, as shown in FIG. 7.

Then an antistatic adhesive 29 is adhered to at least one side wall of the window 282 and the conducting layer 26. That is, the antistatic adhesive 29 may be adhered to one or two side wall of the windows 282, and of course can full fill the window 282. Because there is an antistatic adhesive 29 connecting the conducting layer 26 and the window 282 of the insulating cover layer 28, and the conducting layer 26 is grounded, the antistatic adhesive 29 can prevent or reduce the generation of electro-static charges on the flexure 20, thereby preventing or eliminating ESD. In addition, the antistatic adhesive 29 can take effect enduringly without dipping water and any corrosion.

Preferably, the material of the substrate layer 22 is stainless steel type, and that of the conducting layer 26 and the insulating cover layer 28 are copper and polyimide separately. Specially, the antistatic adhesive 29 is made of conducting polymers, metal particles, metal oxides, or carbon materials. Wherein the conducting polymers contains polyaniline, polypyrrole, poly(p-phenylene), polythiophene, PEDOT-PSS and derivatives thereof. The carbon materials includes carbon fibers, carbon nano-tube and carbon powder. Importantly, the resistance of the antistatic adhesive 29 fluctuate within $10^5 \sim 10^7$ ohm, and the antistatic adhesive 29 has a rapid curing ability at 60~100° C., a strong adhesive ability, and moisture-independent antistatic effect. Furthermore, the antistatic adhesive 29 is durable for supersonic cleaning in water and does not produce any particles.

Figure 8:
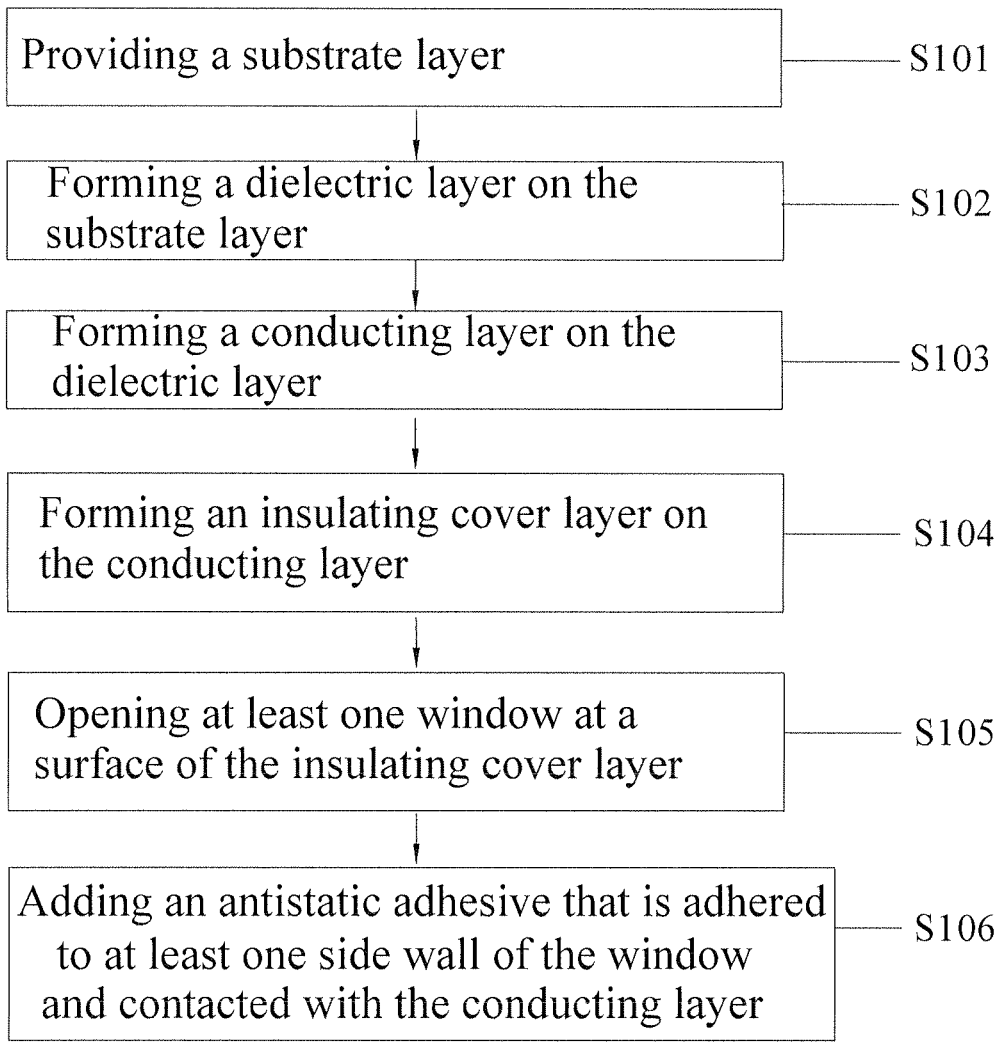
FIG. 8 illustrates a flowchart view of a manufacturing method of a flexure for a suspension of an HGA according to one embodiment of the present invention.

FIG. 8 shows a flowchart of a manufacturing method for the flexure 20 mentioned-above, including steps of:

Step 101, providing a substrate layer;

Step 102, forming a dielectric layer on the substrate layer;

Step 103, forming a conducting layer on the dielectric layer;

Step 104, forming an insulating cover layer on the conducting layer;

Step 105, opening at least one window at a surface of the insulating cover layer thereby a portion of the conducting layer is exposed;

Step 106, adhering an antistatic adhesive to at least one side wall of the window and contacting with the conducting layer.

Preferably, the window is formed by machining or chemical etching. Wherein the machining further contains mechanical cutting and computerized numerical control (CNC) milling, the chemical etching further contains plasma etching and laser ablation.

Preferably, the antistatic adhesive is formed by dipping or spraying.

Preferably, the length of the window is 200 to 600 microns.

Preferably, the length of the window is 300 to 400 microns.

As an embodiment of the present invention, the shape of the windows is triangular, square, rectangular, round, or irregular.

Preferably, the antistatic adhesive is made of conducting polymers, metal particles, metal oxides, or carbon materials.

Preferably, the conducting polymers contains polyaniline, polypyrrole, poly(p-phenylene), polythiophene, PEDOT-PSS and derivatives thereof.

Preferably, the carbon materials contains carbon fibers, carbon nano-tube and carbon powder.

In conclusion, because there is an antistatic adhesive connecting the conducting layer and the window of the insulating cover layer, and the conducting layer is grounded, the antistatic adhesive can prevent or reduce the generation of electro-static charges on the flexure, thereby preventing or eliminating ESD. In addition, the antistatic adhesive can take effect enduringly without dipping water and any corrosion.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A flexure for a suspension of a head gimbal assembly, comprising a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

2. The flexure according to claim 1, wherein the length of the window is 200 to 600 microns.

3. The flexure according to claim 2, wherein the length of the window is 300 to 400 microns.

4. The flexure according to claim 1, wherein the shape of the windows is triangular, square, rectangular, round, or irregular.

5. The flexure according to claim 1, wherein the antistatic adhesive is made of conducting polymers, metal particles, metal oxides, or carbon materials.

6. The flexure according to claim 5, wherein the conducting polymers comprises polyaniline, polypyrrole, poly(p-phenylene), polythiophene, PEDOT-PSS and derivatives thereof.

7. The flexure according to claim 5, wherein the carbon materials comprises carbon fibers, carbon nano-tube and carbon powder.

8. A manufacturing method of a flexure for a suspension of a head gimbal assembly, comprising steps of:

providing a substrate layer;

forming a dielectric layer on the substrate layer;

forming a conducting layer on the dielectric layer;

forming an insulating cover layer on the conducting layer;

opening at least one window at a surface of the insulating cover layer thereby a portion of the conducting layer is exposed;

adhering an antistatic adhesive to at least one side wall of the window and contacting with the conducting layer.

9. The manufacturing method according to claim 8, wherein the window is formed by machining or chemical etching.

10. The manufacturing method according to claim 8, wherein the antistatic adhesive is formed by dipping or spraying.

11. The manufacturing method according to claim 8, wherein the length of the window is 200 to 600 microns.

12. The manufacturing method according to claim 11, wherein the length of the window is 300 to 400 microns.

13. The manufacturing method according to claim 8, wherein the shape of the windows is triangular, square, rectangular, round, or irregular.

14. The manufacturing method according to claim 8, wherein the antistatic adhesive is made of conducting polymers, metal particles, metal oxides, or carbon materials.

15. The manufacturing method according to claim 14, wherein the conducting polymers comprises polyaniline, polypyrrole, poly(p-phenylene), polythiophene, PEDOT-PSS and derivatives thereof.

16. The manufacturing method according to claim 14, wherein the carbon materials comprises carbon fibers, carbon nano-tube and carbon powder.

17. A head gimbal assembly, comprising a flexure, a load beam supporting the flexure, a base plate and a hinge connecting the load beam and the base plate, the flexure comprises a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

18. A disk drive unit, comprising a head gimbal assembly, a drive arm attached to the head gimbal assembly, a disk, and a spindle motor to spin the disk, the head gimbal assembly comprises a flexure, a load beam supporting the flexure, a base plate and a hinge connects the load beam and the base plate, the flexure comprises a substrate layer, a dielectric layer formed thereon, a conducting layer formed on the dielectric layer, and an insulating cover layer covered on the conducting layer, wherein at least one window is configured at a surface of the insulating cover layer thereby a portion of the conducting layer is exposed, and an antistatic adhesive is adhered to at least one side wall of the window and contacted with the conducting layer.

* * * * *